United States Patent [19]
Edwards

[11] 3,921,690
[45] Nov. 25, 1975

[54] PNEUMATIC TIRES

[75] Inventor: Reginald Harold Edwards, Sutton Coldfield, England

[73] Assignee: Dunlop Limited, London, England

[22] Filed: Nov. 7, 1973

[21] Appl. No.: 413,603

[30] Foreign Application Priority Data
Nov. 16, 1972 United Kingdom............... 52909/72

[52] U.S. Cl. .......... 152/354; 152/330 RF; 152/357; 152/361 R; 152/362 R; 152/374
[51] Int. Cl.² B60C 9/02; B60C 15/00; B60C 17/00
[58] Field of Search.............. 152/330 RF, 352–354, 152/357, 362 R, 362 CS, 370

[56] References Cited
UNITED STATES PATENTS

| | | |
|---|---|---|
| 3,232,331 | 2/1966 | Cappa et al........................ 152/354 |
| 3,392,773 | 7/1968 | Warren et al...................... 152/354 |
| 3,542,108 | 11/1970 | Rye et al............................ 152/354 |
| 3,682,223 | 8/1972 | Simpson.......................... 152/362 R |
| 3,842,883 | 10/1974 | Masson............................. 152/354 |

*Primary Examiner*—Drayton E. Hoffman
*Attorney, Agent, or Firm*—Stevens, Davis, Miller & Mosher

[57] ABSTRACT

A radial ply tire whose beads are provided with an apex and clinch strip made from a rubber compound of hardness at least 70° BS and a resilience of at least 60 percent at 50°C. The tire is primarily intended to be used in a tire and wheel assembly which can be run with the tire deflated.

8 Claims, 2 Drawing Figures

PNEUMATIC TIRES

This invention relates to pneumatic tires.

According to the present invention a pneumatic tire comprises a tread braced by a breaker assembly, sidewall portions and beads, and reinforced by a carcass comprising cords extending substantially radially at least in said sidewall portions and turned up about inextensible bead cores, each bead being provided with a rubber apex extending radially outwardly from the bead core and a clinch strip adjacent the rim flange contacting area of the bead, at least these components each consisting of a rubber compound having a hardness of at least 70° BS and a resilience of at least 60 percent measured at 50°C. according to BS 903 part A8, method "C." ("Dunlop Pendulum").

Preferably the compound has a resilience of at least 65 percent, and preferably also a hardness of at least 80° BS.

The problem with which the present invention is concerned is that of heat generation in a tire which is being run in a deflated or under-inflated condition. The tire is preferably thus part of a lubricated tyre and wheel assembly such as is described in our U.S. Pat. No. 3,739,829 or U.S. Pat. Application 150,558, and has a substantially flat tread which is wider than the distance between bead heels when the tire is inflated, preferably at least 35 percent wider. It has been found that the tires of this invention have greatly improved resistance to failure in the bead region in run-flat conditions over tires utilizing conventional compounds in this region.

The tire preferably has an aspect ratio in the range 50 to 75 percent, i.e. ratio of section height to section width.

The tire is preferably of the type described in our U.S. Patent Application Ser. No. 290,814, now U.S. Pat. No. 3,851,691 in which the stiffness of the tread and sidewall structure together with the width of the tread is such that when in use with the tire deflated or substantially deflated and subject to a substantial lateral force one of the said sidewalls will be placed under tension in the region of the contact patch to restrain the tread from lateral movement while the other sidewall will be disposed in a folded state in the said region so as to be capable of acting as a buffer between a flange on a wheel rim on which the tire is mounted and a road surface. It is important in the use of such a tire that the beads should remain in the bead seats when the tire is deflated and should not be able to fall into a well on the wheel rim. Thus either a rim without a well should be used, e.g., a split rim or a rim in which the well has been closed up by axial compression after the tire mounting has been facilitated, or restraining means should be provided to prevent either bead falling into a well, e.g., a bead spacer, spacer units or projections on the wheel rim.

Preferably the rubber in at least the regions of the most severe flexing of the sidewalls of the tire when running deflated has a resilience of at least 85 percent measured at 50°C. More preferably said resilience is over 87 percent and ideally over 90 percent. The hardness of the high resilience rubber in the sidewall is preferably in the range 50° to 65° BS. The regions of severe flexing mentioned above extend radially outwardly from below the point of maximum width of the tyre to the tire shoulder and may extend over one-half to three-fourths or more of the total length of the sidewall.

Preferably however the whole of the inner lining layer inside the carcass of the tire and the sidewall rubber extending outwardly from the clinch strip to the edge of the tread has the high resilience. If desired the topping compound on the cords of the carcass may also have a high resilience but this is not essential owing to the thin layer of rubber involved.

It will be appreciated that a difficulty with rubber compounds of the types used in fabric reinforced pneumatic tires is that a high resilience becomes increasingly difficult to obtain as the hardness of the compound is increased and it also becomes increasingly difficult to measure an actual value for resilience. In the present invention it is desirable that the rubber in the sidewalls and beads is as resilient as is practically possible bearing in mind the other desired properties of hardness, ageing resistance, crack resistance etc.

A tire in accordance with the invention will now be described by way of example only, with reference to the accompanying drawing which is a cross-section of a tire of size 185/60-13 having a carcass 1 of 2 plies of rayon cords extending from bead core to bead core at a bias angle of 82° with respect to the mid-circumferential plane of the tire.

Figure 2:
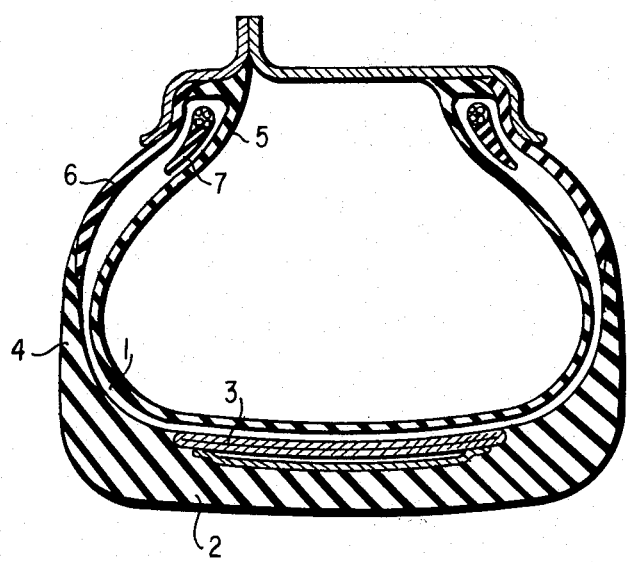
FIG. 2 shows the tire in the inflated condition.
Figure 1:
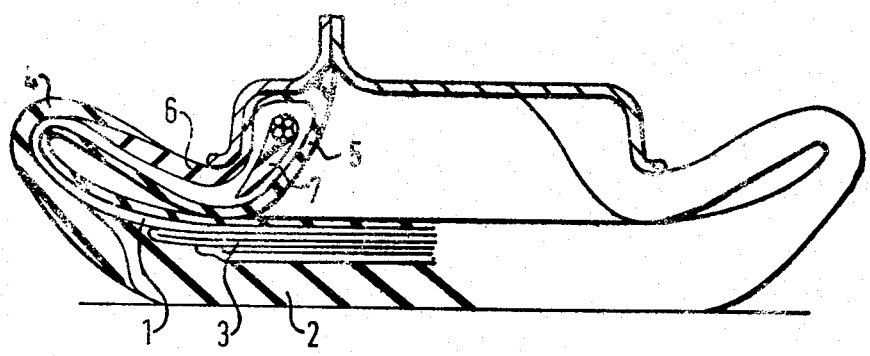
FIG. 1 shows the tire in the deflated condition.

The tread portion 2 of the tire is reinforced by a breaker assembly 3 consisting of two folded plies of rayon cords having a bias angle of 21° to the mid-circumferential plane.

The rubber of the sidewalls 4 of the tire (except the cord topping compound) is a natural rubber compound having a hardness of 59°–61° BS and a resilience of 90 percent measured by the Dunlop Pendulum. A natural rubber compound is also used for the inner liner 5 of the tire this having a hardness of 54°–57° BS and a resilience of 87 percent measured by the Dunlop Pendulum.

Each bead region contains a clinch strip 6 as shown and each bead core is provided with an apex 7 extending radially outwardly therefrom, the clinch strip and bead apex consisting of a rubber compound of hardness 80° BS and a resilience as measured on the Dunlop Pendulum machine of 66 percent. The formulation of this compound is given in Table I below:

TABLE I

| | |
|---|---|
| Natural Rubber | 86.00 |
| SBR 1500 | 14.00 |
| Insol Sulphur | 3.00 |
| Santocure MOR | 1.50 |
| D.P.G. | 0.12 |
| H.M.T. | 0.24 |
| Vulcatard A | 0.45 |
| Stearic Acid | 1.56 |
| Mineral Oil | 1.50 |
| Dutrex RT | 1.90 |
| Rousselet 7550 Resin | 4.80 |
| Escorex Resin | 3.84 |
| Nonox ZA | 2.25 |
| HAF Black | 33.50 |
| N 339 Black | 4.80 |
| Renacit V11 | 0.04 |
| Zinc Oxide | 10.20 |
| | 196.30 |
| Hardness | 80 – 83° BS |
| Resilience | 65–67% Dunlop Pendulum |

The performance of this tire was assessed against that of a similar tire containing a standard bead apex compound of hardness 90° BS and lower resilience by running the tires in a deflated condition with internal lubrication on a 3½inch crimped wheel rim. The formulation of the standard compound is given below in Table II.

TABLE II

| Natural Rubber | 70.00 |
|---|---|
| SBR 1500 | 30.00 |
| Insol Sulphur | 3.20 |
| Santocure MOR | 2.00 |
| D.P.G. | 0.25 |
| H.M.T. | 0.50 |
| Vulcatard A | 0.40 |
| Stearic Acid | 2.18 |
| Mineral Oil | 1.60 |
| Rousselet 7550 Resin | 10.00 |
| Escorex Resin | 8.00 |
| Nonox ZA | 2.00 |
| HAF Black | 70.00 |
| Renacit V11 | 0.10 |
| Zinc Oxide | 4.90 |
| | 205.13 |
| Hardness | 90 – 93° BS |
| Resilience | Low, but compound too hard for actual value to be measured accurately |

TEST CONDITIONS

| Speed: | 40 m.p.h. on dry road |
|---|---|
| Distance: | 14 miles |

Temperature in bead region of tires at end of 14 miles:

| Standard Compound | High Resilience Compound |
|---|---|
| 145°C. | 112°C. |
| Tire failed | Tire not failed |

Having now described our invention what I claim is:

1. A pneumatic tire comprising a tread braced by a breaker assembly, rubber sidewall portions and beads and reinforced by a carcass comprising cords extending substantially radially in at least said sidewall portions and turned up about inextensible bead cores, said tire further comprising an inner lining layer of rubber inside the carcass, each bead being provided with a rubber apex extending radially outwardly from the bead core and a clinch strip adjacent the rim flange contacting area of the bead, said clinch strip and said apex being made of a rubber compound having a hardness of at least 70° B.S. and a resilience of at least 60% measured at 50°C according to B.S. 903 Part A8 Method C - Dunlop Pendulum, and the whole of the inner lining layer and of the sidewall portions extending radially outwardly from the clinch strip to the edge of the tread has a resilience of 85 percent measured at 50°C.

2. A pneumatic tire according to claim 1 in which the rubber compound of the clinch strip and the apex has a resilience of at least 65 percent.

3. A pneumatic tire according to claim 1 in which the rubber compound of the apex and clinch strip has a hardness of at least 80° B.S.

4. A pneumatic tire according to claim 1, having a substantially flat tread which is wider than the distance between the heels of the beads when the tire is inflated.

5. A pneumatic tire according to claim 4 in which the tread is at least 35 percent wider than the distance between the bead heels.

6. A pneumatic tire according to claim 1 having an aspect ratio in the range 50% - 75%.

7. A pneumatic tire according to claim 1 in which the rubber of the inner lining layer and of the sidewall portions has a hardness of 50° – 65° B.S.

8. A penumatic tire according to claim 7 in which the resilience of the rubber of the inner lining layer and of the sidewall portions is at least 87 percent.

* * * * *